United States Patent
Lin et al.

(10) Patent No.: US 9,185,024 B2
(45) Date of Patent: Nov. 10, 2015

(54) PATH SELECTION IN STREAMING VIDEO OVER MULTI-OVERLAY APPLICATION LAYER MULTICAST

(75) Inventors: Yangyang Lin, Hong Kong (HK); Yiu Bun Lee, Kowloon (CN)

(73) Assignee: The Chinese University of Hong Kong, Shatin, New Territories (HK)

( * ) Notice: Subject to any disclaimer, the term of this patent is extended or adjusted under 35 U.S.C. 154(b) by 490 days.

(21) Appl. No.: 13/037,735

(22) Filed: Mar. 1, 2011

(65) Prior Publication Data

US 2011/0219142 A1 Sep. 8, 2011

Related U.S. Application Data

(60) Provisional application No. 61/311,644, filed on Mar. 8, 2010.

(51) Int. Cl.
| | |
|---|---|
| *H04L 12/729* | (2013.01) |
| *H04L 12/18* | (2006.01) |
| *H04L 12/26* | (2006.01) |
| *H04L 12/803* | (2013.01) |
| *H04L 29/08* | (2006.01) |
| *H04L 29/06* | (2006.01) |

(52) U.S. Cl.
CPC .......... *H04L 45/125* (2013.01); *H04L 12/1863* (2013.01); *H04L 12/2697* (2013.01); *H04L 43/0888* (2013.01); *H04L 43/50* (2013.01); *H04L 47/122* (2013.01); *H04L 67/1053* (2013.01); *H04L 65/4076* (2013.01); *H04L 65/80* (2013.01)

(58) Field of Classification Search
CPC .............. H04L 45/125; H04L 12/1863; H04L 12/2697; H04L 43/50; H04L 47/122; H04L 67/1053; H04L 65/4076; H04L 65/80
USPC .......................................................... 709/235
See application file for complete search history.

(56) References Cited

U.S. PATENT DOCUMENTS

| | | | | |
|---|---|---|---|---|
| 7,136,357 | B2 * | 11/2006 | Soumiya et al. .............. | 370/236 |
| 7,558,199 | B1 * | 7/2009 | Minei et al. ................... | 370/230 |
| 8,000,239 | B2 * | 8/2011 | Marcondes et al. .......... | 370/232 |

(Continued)

FOREIGN PATENT DOCUMENTS

| | | | |
|---|---|---|---|
| CN | 101267450 A | | 9/2008 |
| CN | 101646078 A | | 2/2010 |

OTHER PUBLICATIONS

International Search Report and Written Opinion corresponding to the PCT application No. PCT/CN2011/071606, date of mailing Jun. 9, 2011, 9 pages total.

(Continued)

*Primary Examiner* — Joe Chacko
(74) *Attorney, Agent, or Firm* — Kilpatrick Townsend & Stockton LLP; Kenneth R. Allen

(57) ABSTRACT

A method and a tool based on achievable bandwidth as a metric are provided for selecting paths for overlay construction in an application layer multicast system. An in-band bandwidth probing tool according to the invention can estimate achievable bandwidth, i.e., the data throughput that can be realized between two peers over the transport protocol employed. The tool can determine the amount of extra bandwidth available in the target network path so that excess data traffic can be diverted from congested path without causing new congestion in the target path.

11 Claims, 4 Drawing Sheets

(56) References Cited

U.S. PATENT DOCUMENTS

| | | | |
|---|---|---|---|
| 8,064,346 B2* | 11/2011 | Kumaki et al. | 370/237 |
| 2003/0210665 A1* | 11/2003 | Salmenkaita et al. | 370/330 |
| 2004/0081092 A1* | 4/2004 | Rhee et al. | 370/230 |
| 2005/0015511 A1* | 1/2005 | Izmailov et al. | 709/238 |
| 2005/0169313 A1* | 8/2005 | Okamura et al. | 370/477 |
| 2007/0036073 A1* | 2/2007 | Yamada et al. | 370/225 |
| 2007/0036106 A1* | 2/2007 | Karl et al. | 370/331 |
| 2009/0316723 A1* | 12/2009 | Kobatake | 370/468 |

OTHER PUBLICATIONS

Allman et al., "TCP Congestion Control," RFC 2581, Apr. 1999.

Banerjee et al., "Scalable Application Layer Multicast," in Proceedings of ACM SIGCOMM, Aug. 2002.

Burger et al. "Balanced Multicasting: High-throughput Communication for Grid Applications" in the Proceedings of ACM/IEEE Conference on Supercomputing, Dec. 19, 2005.

Castro, et al., "SplitStream: High-bandwidth Multicast in Cooperative Environments," in Proceedings of ACM SOSP, Oct. 2003.

Chu et al., "A Case for End System Multicast," in IEEE Journal on Selected Areas in Communications, vol. 20, No. 8, Oct. 2002.

Handley et al., "TCP friendly rate control (TFRC): Protocol specification," RFC 3448, Jan. 2003.

Hosseini et al., "A survey of application-layer multicast protocols," IEEE Communincation Surveys and Tutorials, vol. 9, No. 3, 2007.

Jain et al. "Path Selection using Available Bandwidth Estimation in Overlay-based Video Streaming" in Proceedings of the IFIP Networking, 2007, Computer Network: The International Journal of Computer and Telecommunications Tetworking vol. 52, No. 12, pp. 2411-2418, Aug. 2008.

Jain et al., "A Quantitative Measure of Fairness and Discrimination for Resource Allocation in Shared Computer System," Technical Report 301, Digital Equipment Corporation, Sep. 1984.

Jain et al., "Pathload: A Measurement Tool for End-to-End Available Bandwidth," in Proceedings of Passive and Active Measurements (PAM) Workshop, 2002.

Jannotti et al., "Overcast: Reliable Multicasting with an Overlay Network," in Proceedings of the OSDI, Oct. 2000.

Jin et al., "On Maximizing Tree Bandwidth for Topology-aware Peer-to-Peer Streaming," in IEEE Transactions on Multimedia, 2007.

Kostic et al., "Bullet: High Bandwidth Data Dissemination Using an Overlay Mesh," in Proceedings of ACM SOSP, 2003.

Kwon et al., "Topology-aware Overlay Networks for Group Communication," in Proceedings of the NOSSDAV, 2002.

Lee et al., "Bandwidth-aware routing in overlay networks," in INFOCOM, 2008.

Lin et al., Path Selection in Streaming Video Over Multioverlay Application Layer Multicast, pp. 1018-1031, IEEE Transactions on Circuits and Systems for Video Technology, vol. 20, No. 7, Jul. 2010.

Liu et al., "Opportunities and Challenges of Peer-to-Peer Internet Video Broadcast," in Proceedings of IEEE, vol. 96, No. 1, pp. 11-24, Jan. 2008.

Mol et al., "The Orchard Algorithm: P2P Multicasting without Free-Riding," in the IEEE International Conference on Peer-to-Peer Computing, pp. 275-282, 2006.

NS2 official homepaqe at http://www.isi.edu/nsnam/ns/.

Okada et al., "A New Approach for the Construction of ALM Trees using Layered Video Coding", in Proc. P2PMMS, 2005.

Pai et al., "Chainsaw: Eliminating Trees from Overlay Multicast," in Proceedings of the IPTPS, Feb. 2005.

PlanetLab official homepage at www.planet-lab.org/.

Ribeiro et al., "pathChirp: Efficient Available Bandwidth Estimation for Network Paths," Proc. Passive and Active Measurements Workshop, Apr. 2003.

Speedtest official homepaqe at http://www.speedtest.net/.

Tian et al., "Robust and Efficient Path Diversity in Application-layer Multicast for Video Streaming," in IEEE Transactions on Circuits and Systems for Video Technology, vol. 15, No. 8, pp. 961-972, Aug. 2005.

To et al., "Parallel overlays for high data-rate multicast data transfer," in Computer Networks, 2007.

Tran et al., "Zigzag: An Efficient Peer-To-Peer Scheme for Media Streaming," in Proceedings of IEEE INFOCOM, 2003.

Venkararamanet al., "Chunkyspread: Heterogeneous Unstructured End System Multicast," in Proceedings of IEEE ICNP, Nov. 2006.

Xiao et al., "OCals: A Novel Overlay Construction Approach for Layered Streaming", Proc. ICC 2008.

Xie et al.,"Coolstreaming: Design, Theory, and Practice," in IEEE Transactions on Multimedia, 2007.

Zhang et al., "Host multicast: A framework for delivering multicast to end users," in Proceedings of IEEE Infocom, Jun. 2002.

Zhao et al., "LION: Layered Overlay Multicast With Network Coding," in IEEE Transactions on Multimedia, 2006.

* cited by examiner

PATH SELECTION IN STREAMING VIDEO OVER MULTI-OVERLAY APPLICATION LAYER MULTICAST

CROSS-REFERENCES TO RELATED APPLICATIONS

This application is related to and claims benefit under 35 USC §119(e) of provisional patent application No. 61/311,644 filed Mar. 8, 2010, the content of which is incorporated herein by reference for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to the field of telecommunication over a digital network and particularly to the area of application layer multicast (ALM). The invention relates specifically to streaming of data representing video.

Application-layer multicast (ALM) is a technology used to broadcast bulk data over networks. ALM has grown in recent years, making the distribution of bulk data such as multimedia data economically feasible for small companies and even individuals. More recently ALM has been further applied to bandwidth-demanding applications such as video streaming to take advantage of its bandwidth efficiency.

The principle of ALM is to organize participating peers into one or more virtual networks, called overlays, on top of the physical network, and then distribute data along the logical paths in the overlays. Construction of the overlay topology is important to its performance and therefore much research has been done in this area.

Common among many of the existing works is the use of round-trip time (RTT) between peers as the metric in selecting paths for overlay construction. See for example, Y. H. Chu, S. G. Rao, S. Seshan, and H. Zhang, "A Case for End System Multicast," in *IEEE Journal on Selected Areas in Communications*, vol. 20, no. 8, October 2002; and S. Banerjee, B. Bhattacharjee, and C. Kommareddy, "Scalable Application Layer Multicast," in *Proceedings of ACM SIGCOMM*, August 2002; and D. Tran, K. Hua, and S. Sheu, "Zigzag: An Efficient Peer-To-Peer Scheme for Media Streaming," in *Proceedings of IEEE INFOCOM*, 2003. For example, a peer selects a path by choosing the peer with the minimum RTT to forward the data. As peers farther apart geographically tend to have longer RTTs between them, by favoring a short RTT the system can exploit the geographic locality of peers to reduce the number of links that the data must traverse. Moreover, nearby peers are more likely to share high-speed network links, which improves performance further. Finally, RTT can also be used to indirectly detect network congestion as queuing delay during congestion will cause the RTT to increase.

Given the wide-spread adoption of the RTT metric in overlay construction, it is therefore important to investigate its actual performance in path selection. Contrary to common beliefs, it may not always provide accurate estimation of bandwidth availability when used in certain configurations. For example, in one environment, if RTT is used to select between two paths then it will correctly identify the higher-bandwidth path only 67.3% of the time, i.e., slightly better than random.

In addition to the RTT metric, researchers have also employed residual bandwidth in path selection. See for example, John Jannotti, David K. Gifford, Kirk L. Johnson, M. Frans Kaashoek, and James W. O'Toole, "Overcast: Reliable Multicasting with an Overlay Network," in *Proceedings of the OSDI*, October 2000; and X. Xiao, Y. Shi, B. Zhang, and Y. Gao, "OCals: A Novel Overlay Construction Approach for Layered Streaming", *Proc. ICC* 2008. Residual bandwidth is defined as the minimum unused capacity of the links along a path and it can be estimated from sending probing packets to the next peer in the overlay topology. An overlay constructed based on residual bandwidth estimations will be very conservative in the sense that it only utilizes the leftover bandwidth in the network for its own data transmissions. This property becomes a strength when the objective is to prevent interference with coexisting traffics, but it will not be suitable for bandwidth-sensitive applications such as video streaming.

More recently an increasing number of ALM protocols began to employ not one, but multiple overlays for data distribution. Multi-overlay ALM protocols can exploit path diversities in the network to de-correlate packet loss [Miguel. Castro, P. Druschel, A. M. Kermarrec, A. Nandi, A. Rowstron and A. Singh, "SplitStream: High-bandwidth Multicast in Cooperative Environments," in *Proceedings of ACM SOSP*, October 2003], to explore more available network bandwidth [K. K. To, Jack Y. B. Lee, "Parallel overlays for high data-rate multicast data transfer," in *Computer Networks*, 2007], and to increase resilience to local network failures as well as peer churn [V. Venkararaman, Paul Francis, and John Calandrino, "Chunkyspread: Heterogeneous Unstructured End System Multicast," in *Proceedings of IEEE ICNP*, November 2006].

In a multi-overlay ALM protocol, the source first splits the original data stream into multiple, say N, sub-streams and then distributes them over the N overlays. Each peer establishes up to N connections to other parent peers according to the overlay topologies to receive and then also forwards the sub-streams to its downstream peers along the overlay networks. Thus each peer is continuously exchanging data with at least N peers. Apart from the data transported, these N connections also provide indirect information of the paths' bandwidth availabilities. This characteristic opened up consideration of an alternative metric for path selection.

Related Work

There are two categories of related work in overlay networks, namely latency-based approaches and bandwidth-based approaches. The focus is in the metrics being used in the construction and adaptation of the overlay topology, and the way such metrics are estimated.

A. Latency-Based Approaches

Latency, typically measured in the form of RTT, has been widely used as the metric for overlay construction. An early study to investigate the feasibility of implementing multicast capability in end hosts resulted in the Narada protocol. Narada first constructs a richer connected graph termed mesh and then builds a spanning tree rooted at the data source by using a variant of a distance-vector routing protocol. Since Narada is designed for delay-sensitive video conferencing applications, the latency of overlay links is used as the primary routing metric to minimize end-to-end delay. The latency is estimated and updated by having peers ping their neighbors periodically. The routing protocol then distributes the latency information so that every host can compute the shortest path (i.e., lowest RTT) to each other.

The NICE protocol was designed to support real-time data applications with large receiver sets, such as news ticker services and stock quotes. In order to keep the control overhead for an average peer constant regardless of system population, the protocol clusters peers into a hierarchy. Peers are clustered according to the distance metric derived from round-trip latency estimations. Latency is estimated by sending a sequence of application-layer probes over UDP and measuring their response times. Each latency estimate is mapped to one of a given set of classes of latency ranges which are then used as the distance metric. The data delivery tree is then constructed from the hierarchy formed.

A topology-aware hierarchical arrangement graph (THAG) [Xing Jin, W.-P. Ken Yiu, S.-H. Gary Chan, Y. Wang, "On Maximizing Tree Bandwidth for Topology-aware Peer-to-Peer Streaming," in *IEEE Transactions on Multimedia*, 2007.] is a scheme targeted at live streaming applications. In THAG the adjacent hosts are organized into a group (like the cluster in NICE but much larger), called an arrangement graph (AG), and hosts serve each other within the same group. Since the size of an AG is still limited, a number of AGs are organized into a hierarchical architecture. To reduce propagation delay for live streams, hosts closer (latency-wise) to the source are assigned to higher level AGs. Furthermore, multiple overlay trees are embedded in each AG for data delivery. The trees are constructed in a way similar to SplitStream [Miguel. Castro, P. Druschel, A. M. Kermarrec, A. Nandi, A. Rowstron and A. Singh, "SplitStream: High-bandwidth Multicast in Cooperative Environments," in *Proceedings of ACM SOSP*, October 2003], where an interior node in a tree is leaf node in all the other trees.

There are numerous other overlay protocols that employ latency as the metric to construct and maintain their overlay topologies. See, for example, B. Zhang, S. Jamin, and L. Zhang. "Host multicast: A framework for delivering multicast to end users," in *Proceedings of IEEE Infocom*, June 2002; and Y. Okada, M. Oguro, J. Katto, and S. Okubo, "A New Approach for the Construction of ALM Trees using Layered Video Coding", in *Proc. P2PMMS*, 2005. A survey by Hosseini et al. [M. Hosseini, D. T. Ahmed, S. Shirmohammadi, and N. D. Georganas, "A survey of application-layer multicast protocols," *IEEE Communication Surveys and Tutorials*, vol. 9, no. 3, 2007] provides for more comparisons.

B. Bandwidth-Based Approaches

For clarity three types of bandwidth are defined: (a) link bandwidth—the maximum bandwidth capacity of the bottleneck link along a network path; (b) residual bandwidth—the unused bandwidth along a network path; and (c) achievable bandwidth—the data throughput achievable by a given congestion-aware transport protocol (e.g., TCP, TFRC, etc.) along a network path.

Most existing work employed residual bandwidth as the metric for overlay construction. For example, Overcast is an early single-tree ALM protocol designed to maximize bandwidth between receiving hosts and the source at the root of the tree. It employs explicit bandwidth probing to determine the initial location to insert new hosts into the existing tree overlay and also reevaluates the bandwidth availability periodically using probing to adapt to changes in the network.

LION [J. Zhao, F. Yang, Q. Zhang, Z. Zhang, and F. Zhang, "LION: Layered Overlay Multicast With Network Coding," in *IEEE Transactions on Multimedia*, 2006] is a more sophisticated ALM protocol that employs multiple overlays for delivery of multi-layer-encoded data. It builds multiple meshes with each mesh delivering one layer of the encoded data. A receiver subscribes to a selected number of overlays to fully utilize its available bandwidth. The mesh overlays are constructed based on bandwidth information measured using active probing tools.

BARON [Sung-Ju Lee, Sujata Banerjee, Puneet Sharma, Praveen Yalagandula, and Sujoy Basu, "Bandwidth-Aware Routing in Overlay Networks," in *INFOCOM*, 2008] is a bandwidth-aware routing scheme for overlay networks that target bandwidth-sensitive applications. When a route between two end hosts is experiencing congestion, BARON finds candidate alternate paths based on link bandwidth and from that selects the best one according to residual bandwidth. Link bandwidth is used for pre-selection because link bandwidth estimates are more stable than residual bandwidth estimates. On the other hand, residual bandwidth estimates are used for the actual selection because it represents the current bandwidth availability.

In another work by Jain and Dovrolis [M. Jain and C. Dovrolis, "Path selection using available bandwidth estimation in overlay-based video streaming," in *Proceedings of the IFIP Networking*, 2007] the authors also proposed to use residual bandwidth as the metric in a link-state overlay routing protocol for video streaming. They found that residual bandwidth can result in better video quality compare to other metrics such as loss ratio and jitter. Their residual bandwidth measurement was also in-band using data traffic, but they have only considered overlay networks built by content providers with up to two hops.

C. Other Approaches

Besides latency and bandwidth metrics, ALM protocols based on other metrics have been developed by researchers. For example, Chunkyspread [V. Venkararaman, Paul Francis, and John Calandrino, "Chunkyspread: Heterogeneous Unstructured End System Multicast," in *Proceedings of IEEE ICNP*, November 2006] constructs a multi-tree overlay based on data delivery delays. Specifically, the choice of parents is determined by the earliest time at which the parents can forward the same chunk of data. The principle is that parents closer to the source will be able to forward data earlier then others and so are favored by the Chunkyspread protocol.

TAG [M. Kwon, S. Fahmy, "Topology-aware Overlay Networks for Group Communication," in *Proceedings of the NOSSDAV*, 2002] exploits knowledge of the physical network topology in constructing its logical overlay tree. The principle is to align the physical and logical topologies so that data will traverse the same path as defined by the routing protocol in the underlying network. If the underlying network's routing protocol is delay-optimized then the resultant overlay tree will also be delay optimized.

A peer in an overlay network is constantly exchanging data with multiple peers, so the actual throughput achieved already provides information on the path bandwidth available. However, unlike file transfer applications such as FTP, video streaming applications typically transfer data at a prescribed data rate rather than as fast as possible. Thus the actual throughput achieved between two peers can only indicate the minimum bandwidth available rather than the maximum bandwidth achievable (unless the throughput is lower than the prescribed video data rate).

For example, suppose the maximum bandwidth achievable between two peers is 1 Mbps, while video data are transferred between the two peers at a prescribed data rate of 1.5 Mbps. In this case, there is clearly not sufficient bandwidth to carry the video stream at the video data rate and so, depending on the implementation of the overlay/transport protocols, either substantial amount of data will be discarded or data delivery will be significantly delayed. Nonetheless, the receiving peer can still measure the throughput of the incoming data, e.g., at about 1 Mbps, to estimate that the path bandwidth is in fact lower than the required video data rate.

On the other hand, if the path bandwidth is higher than the video data rate, e.g., at 3 Mbps versus 1.5 Mbps, the receiving peer will still only measure a throughput of 1.5 Mbps as the sending peer transmit data at the prescribed video data rate. This presents a problem as it means that unused achievable bandwidth in excess of the video data rate is not known to the peers.

What is needed is a new metric for use in path selection and a tool for measurement with the new metric.

SUMMARY

According to the invention, a method and a tool based on achievable bandwidth as a metric are provided for selecting paths for overlay construction in an application layer multicast system. An in-band bandwidth probing tool according to the invention can estimate achievable bandwidth, i.e., the data throughput that can be realized between two peers over the transport protocol employed (e.g., TCP). The tool can determine the amount of extra bandwidth available in the target network path so that excess data traffic can be diverted from congested path without causing new congestion in the target path. Moreover, the probing tool does not incur any bandwidth overhead as it obtains its measurements as a by-product of transporting actual data (as opposed to probing packets). This probing tool has three specific desirable characteristics: (a) it does not require the transmission of additional probing packets (as in active bandwidth measurement tools); (b) it can be implemented at the application layer without modification to the transport protocol; and (c) it can probe for unused bandwidth in excess of the prescribed video data rate. Two specific embodiments of the probing tool are contemplated: a tool implemented at the receiver for receiver-based measurement and a probe implemented at the sender for sender-based measurement. A receiver-based probing tool is likely to have higher bandwidth estimation accuracy.

Achievable bandwidth has three desirable properties. First, compared to latency-based approaches, achievable bandwidth offers substantially higher accuracy in selecting paths with higher bandwidth.

Second, achievable bandwidth can more accurately reflect the actual throughout that can be realized, with the impact of competing traffic and protocol interactions all accounted for. Other approaches, such as use of link capacity to construct an overlay, ignores the effect of competing traffics. At the other extreme, residual bandwidth is very conservative and thus will likely limit the overlay's performance as it can only utilize the bandwidth left over by other competing traffics.

Third, the achievable bandwidth metric allows the use of congestion-aware transport protocols such as TCP and TFRC for data delivery. This promotes fair sharing of bandwidth between the ALM protocol and other competing traffics, and also ensures that the ALM protocol will react to alleviate network congestion in the same way as other Internet applications.

The use of achievable bandwidth in constructing ALM networks presents a new challenge. Specifically, existing bandwidth measurement tools either estimate the link capacity or the link's residual bandwidth. Because these probing tools are not designed to measure achievable bandwidth, they will not take into account the behavior of the transport protocol such as TCP. To illustrate this point consider a hypothetical link of capacity 2 Mbps which has one existing TCP flow consuming 1.5 Mbps of the bandwidth. An ideal active probing tool will measure the link capacity and residual bandwidth to be 2 Mbps and 0.5 Mbps respectively. However, if an ALM network routes one of its data flows transported over TCP to this link, then the new TCP flow will share bandwidth with the existing one, splitting the link capacity equally due to TCP's fair bandwidth sharing property. Thus the actual bandwidth that can be achieved by routing traffic to this link will be only about 1 Mbps (ignoring protocol overheads), which is clearly different from the bandwidth estimated using the existing probing tools that measure link capacity and residual bandwidth.

To analyze and compare the performance of the RTT metric with an achievable bandwidth metric in path selection, a multi-overlay ALM protocol has been developed according to the invention to evaluate the two metrics under the same simulation settings. Results show that (a) packet loss across the overlay networks is not entirely due to network congestion, but also due to topology changes as well; (b) the RTT metric results in significantly more topology changes due to inherent variations in the measured RTT and due to the fact that topology change itself can also affect the RTT of a path; (c) only the achievable bandwidth metric can result in converged overlay topologies. These results strongly suggest that the use of achievable bandwidth metric can offer substantially better performance than the RTT metric in multi-overlay ALM protocols.

The invention will be better understood by reference to the following detailed description in connection with the accompanying drawings.

DETAILED DESCRIPTION OF THE INVENTION

Figure 1:
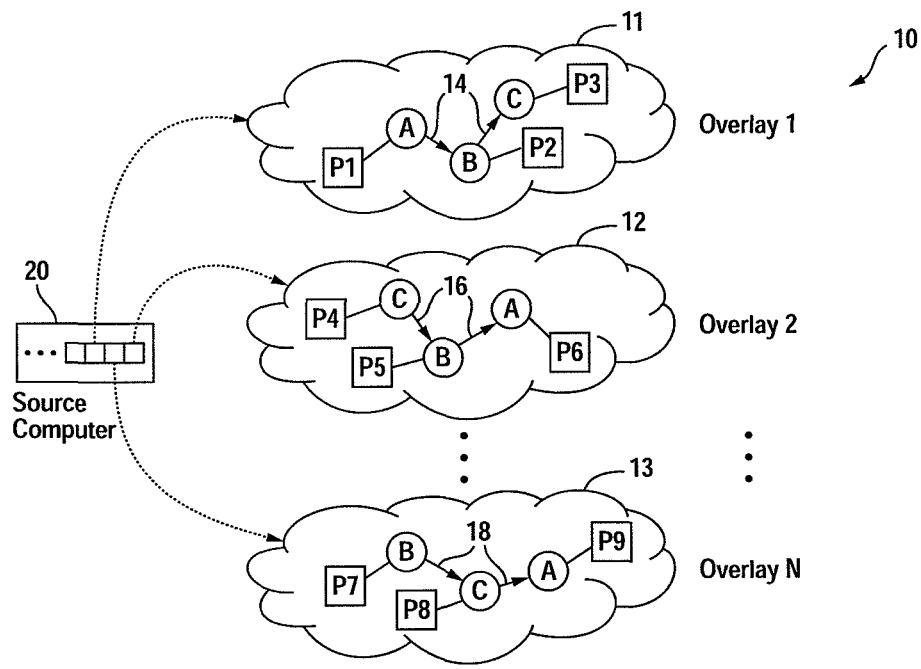
FIG. 1 is a conceptual diagram of a network with application layer multicast.

FIG. 1 illustrates a representative application layer multicast (ALM) environment 10 in which the present invention is implemented. At the application layer 10 in a packet communication system there are a number of overlays 11, 12, 13, each having an overlay network 14, 16, 18 linking peers. A source computer 20 sends data, such as video data, into each of the overlays. Within each overlay network 14, 16, 18, there are any number of peers designated A, B, C. (Each overlay has a different arrangement of peers.) Referring to the first overlay, there is a "sending" peer A, a "receiving" peer B, and typically a "leaf-node" or destination peer C where there are no downstream peers. The sending peer A transmits data on a common or shared physical data path with other overlays to a sequence of data destinations, peers B and C. The same occurs at other overlays. Each of the three sets of the peers A, B, C has associated with it a probing tool P1-P9, respectively (herein PN), that monitors data transmitted and received by its corresponding peer in accordance with the invention.

Figure 2:
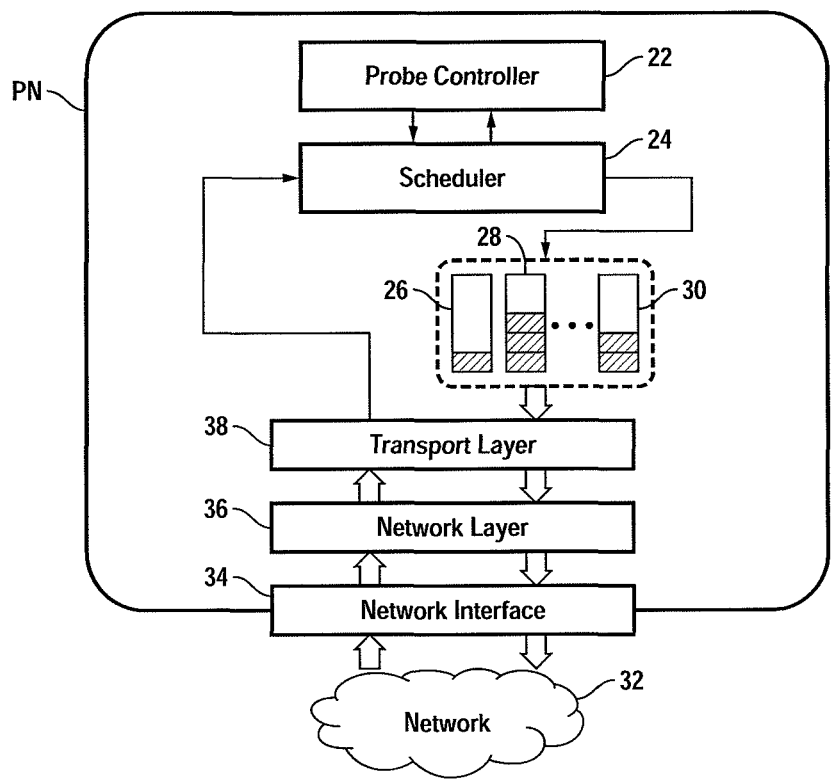
FIG. 2 is a diagram of a system architecture for a probing tool according to the invention.

FIG. 2 illustrates a system architecture for a typical probing tool PN. The probing tool PN includes a probe controller 22, which is the module forming the brain of the tool, a scheduler 24, where the packet delays are scheduled, and one or more transmission buffers, where packets are stored and held for transmission to each downstream peer addressed by that node. There is one transmission buffer for each downstream peer serviced by the probe tool PN. Data, typically video data dressed to or passing through a peer comes from the network 32 and is received through a network interface 34 in a network layer 36, then conveyed to a transport layer 38 that conveys the video data-containing packets to the scheduler 24. Once the data has been scheduled upon query and response of the probe controller 22, it is provided to the assigned buffer for each down stream peer, then each set of buffered (delayed) data is routed to the respective downstream peers via the transport layer, 38, network layer 36, and network interface 34 out into the network 32.

The peer A in an overlay network 11 is constantly exchanging data with multiple peers, so the actual throughput achieved already provides information on the path bandwidth available. However, unlike file transfer applications such as FTP, video streaming applications typically transfer data at a prescribed data rate rather than as fast as possible. Packets are spaced out according to a video bit rate. Thus the actual throughput achieved between two peers can only indicate the minimum bandwidth available rather than the maximum bandwidth achievable (unless the throughput is lower than the prescribed video data rate).

For example, suppose the maximum bandwidth achievable between two peers A, B is 1 Mbps, while video data are transferred between the two peers at a prescribed data rate of 1.5 Mbps. In this case, there is clearly not sufficient bandwidth to carry the video stream at the video data rate and so, depending on the implementation of the overlay/transport protocols, either substantial amounts of data will be discarded or data delivery will be significantly delayed. Nonetheless, the receiving peer can still measure the throughput of the incoming data, e.g., at about 1 Mbps, to estimate that the path bandwidth is in fact lower than the required video data rate.

On the other hand, if the path bandwidth is higher than the video data rate, e.g., at 3 Mbps versus 1.5 Mbps, the receiving peer B will still only measure a throughput of 1.5 Mbps as the sending peer A (of overlay 11) transmits data at the prescribed video data rate. This presents a problem as it means that unused achievable bandwidth in excess of the video data rate is not known to the peers.

The in-band bandwidth probing tool PN of FIG. 2 as provided is designed for video streaming applications. Implemented at each peer A, B, C, and in each overlay, the probing tools P1-P9 operate independently of one another. The probing tool PN has three desirable characteristics: (a) it does not require the transmission of additional probing packets (as in active bandwidth measurement tools); (b) it can be implemented at the application layer without modification to the transport protocol; and (c) it can probe for unused bandwidth in excess of the prescribed video data rate.

Figure 3:
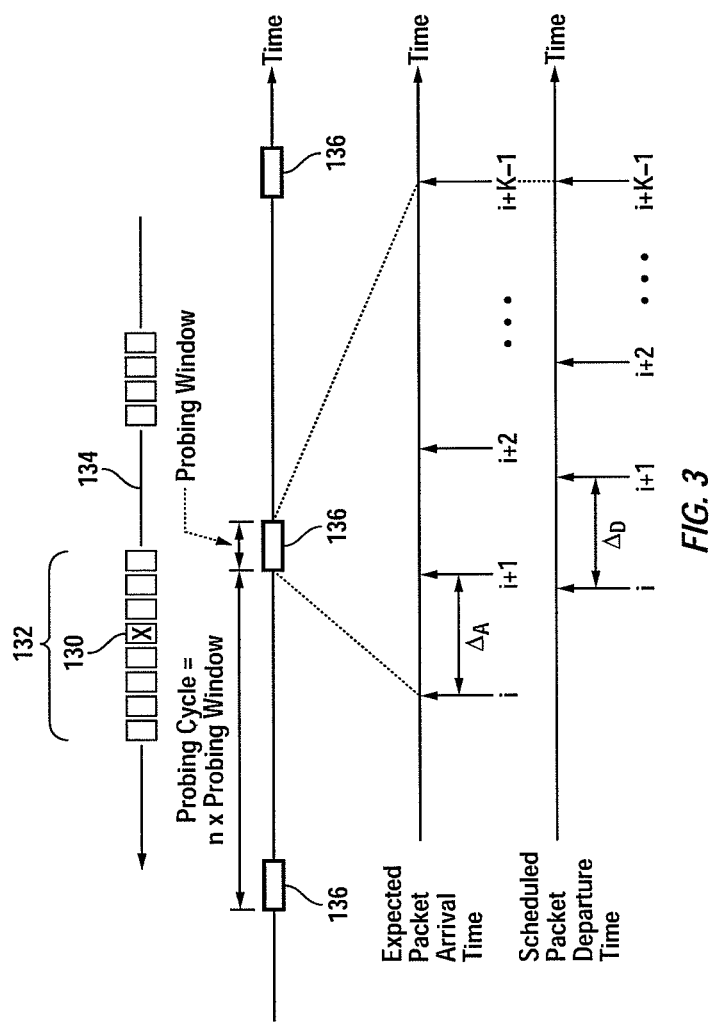
FIG. 3 is a timing diagram that illustrates the in-band bandwidth probing mechanism.

FIG. 3 is a timing diagram that illustrates the in-band bandwidth probing mechanism according to the invention. Probing is performed independently and periodically at each peer once every probing cycle. A probing cycle begins with a probing window of K consecutive video packets, followed by normal video data transmission for a duration of (n−1) times the duration of the probing window. In a probing window, the sending peer transmits video or like packets at a data rate higher than the prescribed video data rate to the receiving peer downstream. These packets 134 can be "marked" (e.g., by a bit "X" 130 in the packet header field 132) so that the receiving peer will measure the incoming data rate during this probing window 136. If the measured data rate exceeds the prescribed video data rate, then it implies that the path between the sending peer and the receiving peer possesses unused achievable bandwidth that can be used for traffic diversion. Depending on the design of the ALM protocol, this bandwidth information can either be used directly by the receiving peer or it can be distributed to other peers or to a rendezvous peer to initiate traffic diversion. Every peer of connected peers performs probing independently, and every peer except the source and the leaf-node peers perform overlay adaptation according to the invention.

Assuming the application transport has congestion control, e.g., TCP, then the underlying transport will block the data from the sending node if it tries to send data faster than the achievable bandwidth available. Thus, to determine the achievable bandwidth the sending node merely needs to send data at a sufficiently fast data rate such that the underlying transport runs into a buffer full condition and then block the sending node from sending more data. The resultant rate of data transmission allowed by the application transport is by definition the achievable bandwidth. Hence the process can be done by the sending node without requiring exchanges of messages or feedbacks of packet arrival timings from the receiving node, although message exchange is useful. Normally in video streaming the video data rate may not use up the achievable bandwidth available and thus the transport never blocks. This prevents the sending node from knowing the true achievable bandwidth available as it cannot probe for bandwidth beyond the video data rate. The probing method solves this problem by delaying the forwarding time of incoming packets so that the outgoing data rate during short periods can be raised above the video bit rate, thus allowing the peer to probe for unused bandwidth.

Figure 4:
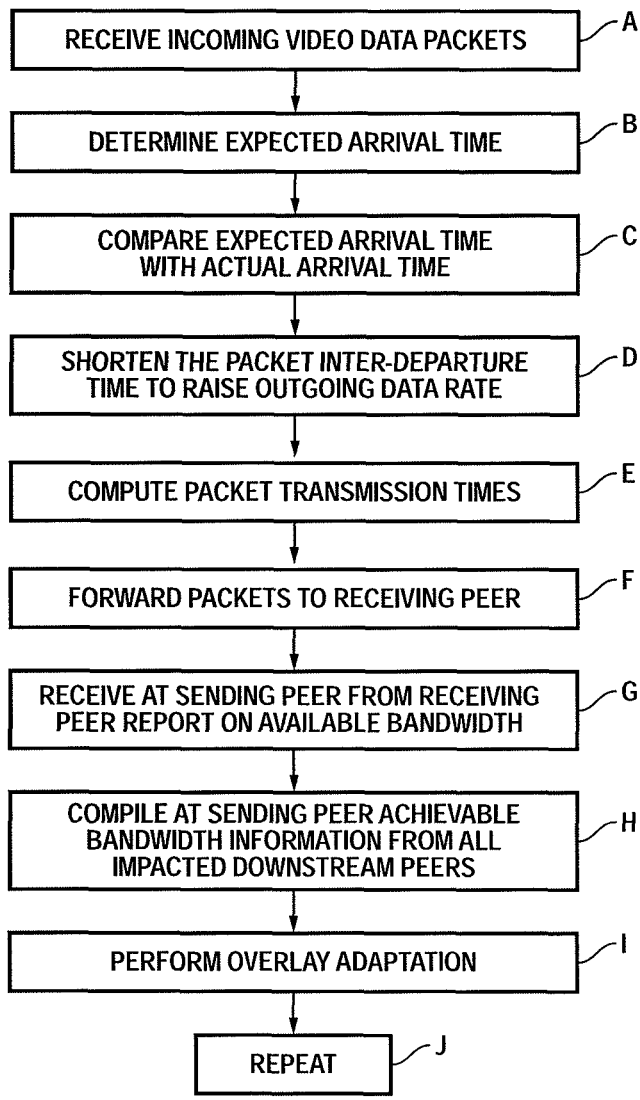
FIG. 4 is a flow chart of operation of a probing tool according to the invention.

The probing tool PN, in a specific embodiment for a receiving peer, is typically a software module operative according to the procedures explained below as illustrated in FIG. 4 and operates in cooperation with other probing tools as follows:

Let $R_v$ be the prescribed video data rate and assume video data are divided into fixed-size packets of L bytes. The probing tool PN receives the incoming video data packets from the transport layer (STEP A). The expected incoming video packet inter-arrival time is determined as denoted by $\Delta_A$, and is given by (STEP B):

$$D_A = L/R_v. \tag{1}$$

The probing tool PN then compares the actual arrival time with the expected arrival time (STEP C). The probing tool at the receiving node can measure the actual arrival time and report it to the probing tool at the sending node. In an alternative embodiment, the probing tool at the sending node estimates the outgoing arrival time from the outgoing data rate. To raise the outgoing data rate by a probing factor off (where f>1), the probing tool shortens the video packet inter-departure time, denoted by $\Delta_D$, (STEP D) to:

$$D_D = L/(fR_v). \tag{2}$$

Specifically, let $a_i$ and $a'_i$ be the actual and expected time for data packet i to arrive at the sending peer and let $d_i$ be the scheduled departure time for transmitting packet i to the downstream receiving peer 15. Assume the probing window consists of data packets i to i+K−1. Then the probing tool schedules the departure time of packet (i+K−1) to the packet's expected arrival time:

$$d_{i+K-1} = a'_{i+K-1}. \tag{3}$$

Next working backward the probing tool computes the transmission times of the remaining packets (i.e., i to i+K−2) in the probing window (STEP E) using the shortened inter-departure time $\Delta_D$:

$$d_{i+K-j} = a'_{i+K-1} - (j-1)D_D. \quad (4)$$

In other words the expected scheduling delay $d_j$ experienced by packets in the probing window, denoted by $\{\delta_j | j=i, i+1, \ldots, i+K-1\}$ is given by:

$$\begin{aligned} d_j &= d_j - a'_j \quad (5) \\ &= (a'_{i+K-1} - ((i+K-1)-j)D_D) - a'_j \\ &= (a'_{i+K-1} - a'_j) - ((i+K-1)-j)D_D \\ &= ((i+K-1)-j)D_A - ((i+K-1)-j)D_D \\ &= ((i+K-1)-j)(D_A - D_D). \end{aligned}$$

Substituting (1) and (2) into (5) we have:

$$d_j = \frac{L((i+K-1)-j)(1-f^{-1})}{R_v}, \quad (6)$$

assuming packets arrive at their expected arrival time. Then the probing tool computes the maximum scheduling delay from:

$$\begin{aligned} \delta_{max} &= \max_{j=i,\ldots,(i+K-1)} \{\delta_j\} \quad (7) \\ &= \max_{j=i,\ldots,(i+K-1)} \left\{ \frac{L((i+K-1)-j)(1-f^{-1})}{R_v} \right\} \\ &= \frac{L(K-1)(1-f^{-1})}{R_v}, \text{ when } j = i. \end{aligned}$$

The probing tool then forwards the packets (STEP F), with the first packet (i.e., packet i) in a probing window experiencing the longest scheduling delay.

In practice, the actual packet arrival time $a_j$ may deviate from the expected arrival time $a_j'$. Accordingly a peer simply substitutes $a_j'$ for $a_j$ in Equation (5) to compute the scheduling delay. In case the packet arrives so late such that $\delta_j<0$, then it will be transmitted immediately. In this case the probing data rate may be affected.

The sending peer is responsible for adding scheduling delay to raise the outgoing data rate of its incoming data. However, the receiving peer measures its own incoming data rate and reports the measured rate back to the sending peer (STEP G). The sending peer then collects and compiles all the resultant measurement data from all its downstream peers to compute the achievable bandwidth (STEP H). Then the sending node performs overlay adaptation to route video packets into the overlay path that is calculated to be optimum (STEP I) and then repeats the process on further incoming packets (STEP J). This process occurs in each peer in succession in a path, as noted.

The probing process does not employ any extra packets, and its duration (the probing window 36 of FIG. 3) is short compared to the probing cycle. Thus there will be relatively long periods between overlay adaptation where packets are not delayed but are forwarded immediately upon arrival. This is done in order to reduce the likelihood of two different peers probing at the same time and thus introducing extra scheduling delay that affects probing accuracy. Probing accuracy depends upon an assumption that no extra delays of another overlay occur during a probing window. The issue of cascaded bandwidth probing is analyzed herein below.

As should be understood, scheduling delay is extra delay introduced by the bandwidth probing mechanism to the end-to-end data delivery delay. From (7) it is shown that scheduling delay is proportional to the probing window size K and the inverse of the probing factor f. Configuration of these two parameters enables the designer to trade off between probing accuracy, probing bandwidth, and scheduling delay.

Specifically, increasing K will lead to longer probing window and thus provides more accurate measurement of the achievable bandwidth, at the expense of longer scheduling delay and vice versa. The probing factor f on the other hand determines the maximum achievable bandwidth that can be measured. Thus larger values off will allow more bandwidth to be discovered, again at the expense of longer scheduling delay.

The in-band bandwidth probing tool of the invention is designed to be independent of the ALM protocol and thus these two parameters enable the probing tool to be optimized for the specific ALM protocol. As a rule of thumb, we will first select window size K to ensure robust bandwidth measurement accuracy and then determine the probing factor f either statically (e.g., subject to delay and buffer constraints) or adaptively (e.g., based on bandwidth availability and demand).

In an alternative embodiment, the probing tool according at the sending peer can perform all functions, wherein the sending peer adds both scheduling delay to raise the outgoing data rate and measures the outgoing data rate to estimate the actual arrival time, rather than relying on reports of the actual arrival time from a receiving peer. Nevertheless, sender-based measurement could have a lower bandwidth estimation accuracy due to the factors described above. In practice, the difference is not critical.

There are other practice considerations. The scheduler is subject to delay and buffer constraints set by the application. Specifically, let $B_p$ be the size of the pre-fetch buffer allocated to absorb the scheduling delay. The pre-fetch buffer will be filled with video data before playback begins and thus can absorb the extra scheduling delay introduced by the bandwidth probing mechanism.

To prevent playback starvation, there must be sufficient video data in the pre-fetch buffer to sustain playback during bandwidth probing. Let H be the maximum depth of the overlay network, i.e., a packet will be forwarded by at most (H−1) peers (including the source) before reaching the receiver, then we have the following constraint on the scheduling delay:

$$\delta_{max}(H-1) \leq B_p/R_v \quad (12)$$

Substituting (11) into (12) and rearranging terms we have $$f \leq \left(1 - \frac{B_P}{L(K-1)(H-1)}\right)^{-1} \quad (13)$$

Thus given the delay constraint and the probing window size K we can determine the maximum probing factor f that can be used without causing video playback interruptions.

The depth of the overlay network H is proportional to the size of the ALM population. Thus for very large ALM networks, the accumulated scheduling delay as derived in (12) could lead to the need for large pre-fetch buffer and consequently long startup delay. For example, assume video packet size L=10 KB, video data rate $R_v$=800 Kbps, probing factor f=2, and probing cycle K=30 packets, then from (11) the computed maximum scheduling delay $\delta_{max}$ will be equal to 1.45 seconds. For a large ALM network with a depth of H=6, the worst-case delay will reach 7.25 seconds. Coupled with the buffer needed to absorb normal packet delay variations, the total pre-fetch buffer needed will exceed 7.25 seconds.

Nevertheless the above scheduling delay is based on the worst-case scenario only. Consider an ALM network of depth H. Assume bandwidth probing is performed periodically with a cycle n times the duration of the probing window. Then the probability for a data packet to arrive within the probing window is equal to 1/n. Thus the probability of a data packet to join the probing window in H−1 consecutive hops, denoted by $P_{H-1}$, is given by:

$$P_{H-1} = \frac{1}{n^{H-1}} \quad (14)$$

For example, with n=30 and H=6, the probability is merely 0.00000004 and so is not significant in practice.

A second, more subtle problem with cascaded probing is that it may negatively affect probing accuracy, leading to underestimated bandwidth. To understand why, recall that the delay to be added to a probing packet $\delta_i$ is computed based on the expected packet arrival time. If a packet arrives so late such that the computed $\delta_i$<0, then the resultant probing data rate may become lower than that specified by the probing factor f. This can occur whenever a probing packet was previously delayed by another probing window upstream.

To estimate the significance of this problem, we compute below the probability of a packet participating in more than one probing windows along the delivery path from the source to the destination. Assuming the overlay tree is a binary and balanced tree with depth H. Then the number of peers at level l is $2^l$. Recall that the probability for a data packet to arrive within the probing window is equal to 1/n. Then when a packet arrives at a peer at tree level l, the probability of it having participated in more than one probing windows is given by $$P_{>1,l} = \sum_{m=2}^{l} \binom{m}{l} \left(\frac{1}{n}\right)^m \left(1 - \frac{1}{n}\right)^{l-m} \quad (15)$$

In a balanced binary overlay tree with H levels the proportion of peers at level l, denoted by $\rho_l$, is given by $$r_l = \frac{2^l}{2^H - 2} \quad (16)$$

Here $2^H-2$ is the total number of peers, excluding the source peer, in the balanced overlay tree. Thus the average probability of cascaded probing across all peers in the overlay tree can then be computed from $$P_{>1} = E[P_{>1,l} | \rho_l] = \sum_{l=2}^{H-1} P_{>1,l}\rho_l \quad (17)$$

For example, with n=30 and H=6, this expected probability is equal to 0.0074.

Another side effect of probing is increased delivery delay. Specifically, incoming packets participating in a probing window are delayed according to (10) in order to raise the outgoing data rate. Assuming it is equally probable for a packet to arrive at any time during a probing window. Then the scheduling delay, denoted by the random variable δ, for a randomly arriving packet will be uniformly distributed between 0 and $LR_v^{-1}(K-1)(1-f^{-1})$.

If a packet participates in m probing cycles end-to-end, then its accumulated scheduling delay, denoted by $\delta^{(m)}$, can be computed from the m-times auto-convolution of δ:

$$\delta^{(m)} = \underbrace{\delta * \cdots * \delta}_{m} \quad (18)$$

For a packet destined to a peer at tree level l, the probability for it to participate in m probing windows is $$P_{m,l} = \binom{m}{l}\left(\frac{1}{n}\right)^m\left(1-\frac{1}{n}\right)^{l-m} \quad (19)$$

Assuming a balanced binary tree, then the scheduling delay distribution can be computed from taking expectation over peers at all levels of the overlay tree, i.e., $$P = \sum_{m=1}^{H-1}\left[\sum_{l=m}^{H-1}\left(\frac{2^l}{2^H-2}\right)P_{m,l}\right]\delta^m \quad (20)$$

The foregoing mathematical model has employed two assumptions, namely the overlay tree is balanced and the individual scheduling delay is uniformly distributed. The impact of these two assumptions is tested by relaxing them in a discrete-event simulator.

Figure 5:
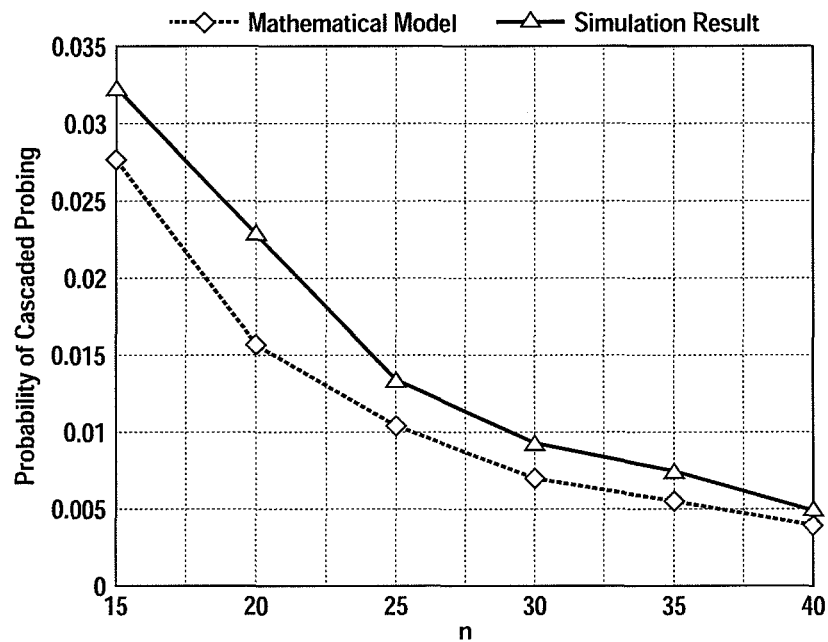
FIG. 5 is a first graph showing comparison of a mathematical model and a simulation result.

FIG. 5 compares the probability distribution of cascaded probing versus n—the ratio between duration of probing cycle and duration of a probing window. As expected, cascaded probing can be reduced by increasing n as the probing window will be spaced temporally farther apart. The tradeoff for larger n is potentially slower reaction to path bandwidth variations. For example, with n=40 and K=30, a probe will be initiated every 120 seconds and in this case the probability of cascaded probing is 0.0042.

Compared to the numerical results computed from the mathematical model, the simulated cascaded probing probability follows the same trend but at slightly higher values. This is because in simulation the constructed overlays are not necessarily balanced tree—this increases the probability of cascaded probing as the average overlay tree depth will be larger, resulting in more peers with larger depths.

Figure 6:
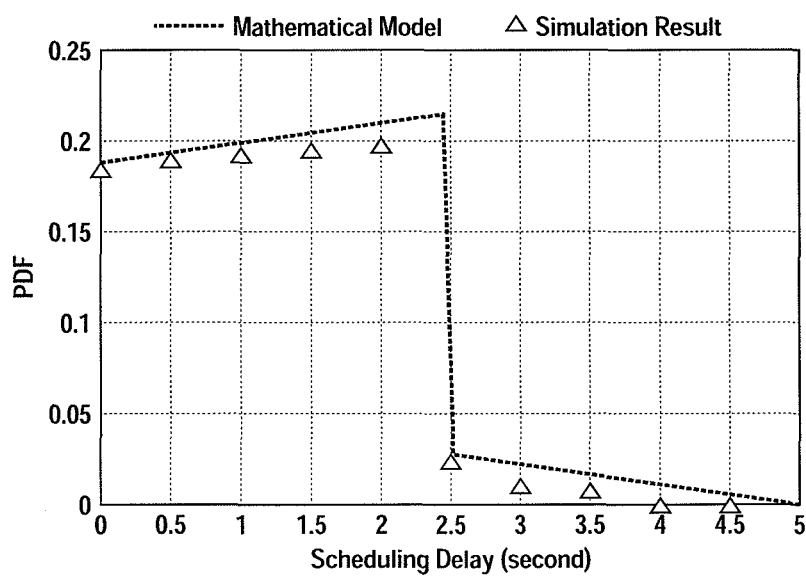
FIG. 6 is a second graph showing comparison of a mathematical model and a simulation result.

Next by simulating the actual scheduling delay with n=30, H=6, K=30, results are plotted in FIG. 6. The results confirm that the mathematical model closely approximate the simulation results. Due to the very small probability of cascaded probing the scheduling delay is nearly uniformly distributed from 0 to 1.5 seconds, beyond which the probability is insignificant.

The in-band bandwidth probing tool described herein above can generally be incorporated into any ALM protocols that employ multiple overlays for data distribution. To facilitate evaluation and comparison of path selection using achievable bandwidth versus RTT, a reference multi-overlay ALM protocol has been developed partly based on existing designs and introduced a new adaptive mechanism to make use of achievable-bandwidth/RTT information to refine the overlay topology at runtime.

In a multi-overlay ALM network, the source splits the original data stream into N sub-streams with each sub-stream to be delivered over one of the N overlays. Specifically, the original video data stream is divided into fixed-size packets and each packet is assigned a sequence number to represent its playback order in the stream. Packet i in the original data stream will be delivered to overlay i mod N. Assuming the video data stream is constant bit-rate encoded at a video bit-rate of $NR_v$ bps then each sub-stream will carry a data stream with rate $R_v$ bps.

Overlays are constructed independently of each other. There are many existing overlay construction protocols. For the purpose of this work, a RTT-based overlay construction method has been adopted wherein a designated rendezvous node keeps track of the most recently joined peers, say $\{p_i | i=0, 1, 2 \ldots M\}$ where M is a system-wide parameter. When the rendezvous node receives a join request from a joining peer, it responds with a random subset of $\{p_i | i=0, 1, 2 \ldots M\}$. The joining peer then selects from the subset the N peers with the smallest RTT subject to satisfying the peers' outbound degree limit. This method reduces the load of the rendezvous peer and also promotes load balance across existing peers in the ALM network. It is worth noting that the proposed bandwidth probing mechanism is not coupled with the way the overlays are initially constructed and thus can be applied to any overlay construction methods to refine the overlay topologies.

In each overlay, video data are delivered from peer to peer using a congestion-aware transport protocol such as TCP or TFRC. In the simulation implementation employed, the widely-used TCP protocol was used as transport as it is congestion-aware and is compatible with firewalls—an important feature in an ALM network. As the transport is congestion-aware it could block the sender from sending data in case network bandwidth is insufficient. In that case data will accumulate inside a peer's forwarding buffer (one for each child) until the buffer is full, in which case the oldest data packet in the buffer will be discarded to make room for the arriving data packet. Thus, although the transport protocol guarantees no data loss, some data may still be discarded due to buffer overflow in the forwarding peers. These losses reflect the lack of bandwidth in distributing the data to the peers at the prescribed data rate.

After the overlay construction phase all peers in the overlay network will begin the measurement of achievable bandwidth periodically using the in-band bandwidth probing tool as described in connection with FIG. 4. The system uses a fixed-size probing window and adapts the probing factor f using an addictive-increase-abrupt-decrease algorithm resembling the AIMD algorithm in TCP's congestion control mechanism. Specifically, each peer maintains its own probing factor which begins with f=1. It will increase f by σ in each probing cycle until it reaches the maximum value as dictated by the delay constraint (c.f. (13)). At any time if the measured achievable bandwidth, denoted by B, becomes lower than $(f-\sigma)R_v$, then the probing factor will be reset to $$f=[B/\sigma]\sigma+\sigma \quad (21)$$

This step differs from TCP's AIMD algorithm as unlike TCP the now lower bandwidth B is not known, which we could have used to reset the point of adaptation directly.

This adaptation algorithm is designed to incrementally probe for additional unused achievable bandwidth. The parameter σ controls the aggressiveness of the bandwidth probing mechanism. Too small a value will increase the time to discover unused bandwidth while too large a value may cause the probing packets to experience longer delay due to queuing time inside the sending peer's transmission buffer. In the present instance, it was found that a step size of σ=0.1 works well across a wide range of system parameters.

The foregoing above is only one way to make use of the in-band bandwidth probe. In particular, the presented algorithm performs adaptation locally without incorporating other information such as the bandwidth availability of other peers, the current bandwidth demand, load balance across different peers, path delays, path bandwidth stability, and the like. In addition, the above algorithm only probes for unused bandwidth in existing paths (N paths per peer in a N-overlay ALM network). More sophisticated ALM protocols could also explore new paths by reconfiguring the topology within an individual overlay.

Each overlay in the ALM session adapts to network congestions independently of each other session. The principle of the adaptation mechanism is to divert part of the data flow from the congested path to another path with unused achievable bandwidth. This process consists of three steps, namely adaptation triggering, data diversion, and path selection.

The adaptation process is triggered by monitoring of incoming data throughput from a peer's parent. Each peer measures the data rate $r_i$ at which data of overlay i are received from its parent averaged over a sliding window of duration W. Let $r_i'$ be the data rate expected to be received from the parent. If there is sufficient bandwidth, then $r_i = r_i'$, otherwise $r_i < r_i'$. To reduce unnecessary adaptation triggered by random bandwidth fluctuations, a peer node will select a new path only if the measured bandwidth drops beyond a given threshold defined by T as follows:

$$\frac{r_i' - r_i}{r_i'} > T \quad (22)$$

For example, if T=0.1 then the peer will trigger adaptation when the incoming data rate drops below the expected data rate by 10% or more.

Once triggered the adaptation process will find a new parent peer to divert data traffic from the congested path. Below is a list of the pseudocode for the path selection algorithm.

```
Procedure Path Selection
Input: Original-Path
Output: Alternative-Path, Rerouted-Data
   1.        i ← Original-Path
   2.        Alternative-Path ← None
   3.        Max-Bandwidth ← 0
   4.        if max{d_{i,j} |j = 1, 2...N} ≠ 0 then
   5.           k ← argmax(d_{i,j}) for j = 1,2...N
   6.           R_d ← d_{i,k}
   7.        else
   8.           k ← i
   9.           R_d ← r_k' - r_k
```

-continued

| | |
|---|---|
| 10. | end if |
| 11. | P ← candidate peers for overlay k |
| 12. | for each p in P do |
| 13. |     if B(p) > Max-Bandwidth then |
| 14. |         Max-Bandwidth ← B(p) |
| 15. |         Alternative-Path ← p |
| 16. |     end if |
| 17. | end for |
| 18. | Rerouted-Data ← min(R$_d$, Max-Bandwidth) |
| 19. | return Alternative-Path, Rerouted-Data |

A subtle complexity is that in addition to its normal data traffic, a path may have been previously assigned to carry diverted traffic from another overlay in a previous round of overlay adaptation. If such a path becomes congested, then instead of diverting data traffic to yet another alternative path, the system will instead re-divert the diverted traffic it is currently carrying to remedy congestion. This mechanism helps reduce the topological complexities of the ALM network.

Specifically, each peer maintains a two-dimensional array $\{d_{i,j} | j=1, 2, \ldots, N\}$ where $d_{i,j}$ is the proportion of data of overlay j which were received through overlay i due to traffic diversion. If max $\{d_{i,j} | j=1, 2 \ldots N\}=0$, then there is no diverted traffic in the congested path so the algorithm will simply divert the excess of the normal data traffic, denoted by the data rate $R_d$, to another path:

$$R_d = r_i' - r_i \quad (23)$$

Otherwise if max $\{d_{i,j} | j=1, 2 \ldots N\} \neq 0$, then the system will attempt to re-divert the largest existing diverted traffic from overlay k instead $$k = \underset{j=1,2KN}{\mathrm{argmax}}\{d_{i,j}\} \quad (24)$$

and the corresponding data rate of the to-be-re-diverted traffic is given by $$R_d = d_{i,k} \quad (25)$$

Next the algorithm selects a new path to carry the diverted data traffic. First, peers that will create loops in the overlay and peers with insufficient unused achievable bandwidth are eliminated from the set of candidate peers P. Let B(p) be the unused achievable bandwidth of peer p as measured using the bandwidth probing mechanism herein above. Then the system will select the peer, denoted by q, with the largest unused achievable bandwidth (pseudocode lines 12-17):

$$q = \underset{p \in P}{\mathrm{argmax}}(B(p)) \quad (26)$$

and the data rate of the diverted data traffic is equal to (line 18)

$$D = \min(R_d, B(q)) \quad (27)$$

In experiments, substantial data loss was observed during some of the overlay adaptations. These losses were not due to insufficient bandwidth, but are the direct consequence of data delivery sequence differences between an old and a new parent peer. Specifically, peers in the ALM network receive a copy of the same data packet at different times depending on their relative location in the overlay tree, network delays, etc. Let $s_i(t)$ be the data sequence number being forwarded by peer i at time t. Consider peer i who switch from its old parent peer j to a new parent peer k at time t, then the incoming data stream from peer j will stop at $s_j(t)$. On the other hand the new parent peer k will be able to begin forwarding data to peer i starting from data sequence number $s_k(t)$. Now if $s_k(t) > s_j(t)$ then the data between the two sequence numbers are no longer available from the new parent peer k and will appear as data loss to peer i.

To tackle this problem which may otherwise skew the performance comparisons, a make-before-break mechanism may be used where data forwarding from the old parent will not be stopped until its sequence number catches up with the new parent, e.g., peer j will keep forwarding data to peer i until time t' where $s_j(t') = s_k(t)$.

Further information about simulations and results are found in the Ph.D dissertation at the Chinese University of Hong Kong of the co-inventor Yangyang Lin.

The invention has now been explained with reference to specific embodiments. Other embodiments will be evident to those of skill in the art. It is therefore not intended that this invention be limited, except as indicated by the appended claims.

What is claimed is:

1. In a multicast data communication system, a method for selecting paths for video data between a source and ultimate destination peer nodes, the method comprising:
   providing in-band bandwidth probing tools at peer nodes between the source and the destination peer nodes, each said probing tool being independently operative and without reliance on information on link capacity and numbers of flows passing through a link as reported by routers, wherein network paths between the peer nodes are defined at an application layer of the multicast communication system in a plurality of application layer overlays;
   at each peer node that has a probing tool,
   determining achievable bandwidth of video data directed through said peer node, where achievable bandwidth is established by measured data rate, the measured data rate being determined by measuring actual data rate of incoming video data at the peer node to determine if the measured data rate exceeds a prescribed data rate of a congestion-aware transport protocol for the video data, wherein network paths accommodate at least one protocol other than the congestion-aware transport protocol;
   using the achievable bandwidth as a metric at said peer node to determine useable bandwidth at the application layer for said node; and
   selecting a preferred path among paths defined at the application layer to divert a fraction of video data traffic from a congested path onto another path that has the useable bandwidth.

2. The method of claim 1 wherein the probing tool is operative on a probing cycle to schedule temporary delays for transmission of received video packets for use in determining achievable bandwidth; and wherein said determining step includes comparing expected packet arrival time and actual packet arrival time.

3. The method of claim 2, the probing tool at a receiving peer node measuring actual packet arrival time of video data that is received from a parent sending peer node; and
   reporting the actual packet arrival time to the parent sending peer node whereat said comparing step is performed.

4. The method of claim 2, the probing tool at a sending peer node estimating the actual arrival time at a downstream peer receiving peer node.

5. The method of claim 2, said peer node causing diverting of a portion of the video data traffic when measured achievable bandwidth drops below a predetermined threshold in order to reduce delays that follow from path diverting.

6. The method of claim 1 including steps of:
keeping track of previous diverted traffic paths;
upon determination of congestion on a previous diverted traffic path, rediverting previously diverted video data traffic to remedy the congestion without diverting the video data traffic to a further alternative traffic path.

7. The method of claim 1 including the step of terminating a previous traffic path only after video data traffic on a newly activated alternate traffic path has caught up with the video data traffic on the previous data path.

8. An apparatus for a multicast data communication system comprising:
at nodes in network paths of the multicast data communication system, wherein each node comprises one or more of a hardware processor and a memory coupled to the one or more hardware processors wherein the memory includes instructions that are executed by the hardware processor, probing tool at the application layer is executed by the one or more hardware processor, each said probing tool operating independently of control of other said probing tools and without reliance on information about link capacity and numbers of flows passing through a link as reported by routers, each probing tool for determining achievable bandwidth for video data packet traffic, where achievable bandwidth is established by measured data rate, the measured data rate being determined by measuring actual data rate of incoming video data at the peer node to determine if the measured data rate exceeds a prescribed data rate of a congestion-aware transport protocol for the video data, wherein network paths accommodate at least one protocol other than the congestion-aware transport protocol;
each said probing tool being coupled to a transport layer having data buffers for video data packets, the transport layer being connected to a network layer in communication with a data network, the probing tool for use to cause path diversion of a portion of video data into paths defined at the application layer between a source node and ultimate destination peer nodes, the probing tool having a probe controller and a scheduler, the scheduler being operative to schedule delays in the sending of the video data at the data buffers, the probe controller being coupled to the scheduler and being operative to control the scheduler to direct video data packets at the data buffers.

9. The apparatus of claim 8 wherein the probing tool is operative to cause delay in forwarding time of streaming video packets during a probing window so that outgoing data rate of the streaming video packets is raised above a pre-established video bit rate; to use the outgoing data rate during the probing window to determine actual packet arrival time and to compare actual packet arrival time with an estimated arrival time in order to obtain an estimate of the achievable bandwidth.

10. A method for a multicast data communication system comprising:
at nodes of network paths of the multicast data communication system, determining achievable bandwidth of video data packet traffic at the application layer using a probing tool operating independently of control of other probing tools at other nodes and without reliance on information on link capacity and numbers of flows passing through a link as reported by routers, each probing tool for determining achievable bandwidth for video data packets, where achievable bandwidth is established by measured data rate, the measured data rate being determined by measuring actual data rate of incoming video data at the peer node to determine if the measured data rate exceeds a prescribed data rate of a congestion-aware transport protocol for the video data, wherein network paths accommodate at least one protocol other than the congestion-aware transport protocol;
the application layer being above a transport layer having video data buffers, the transport layer being over a network layer, the network layer being coupled to a network for carrying the video data packet traffic between a source and destination peer nodes, the probing tool for use to cause path diversion of a portion of video data into paths defined at the application layer between a source node and ultimate destination peer nodes, the probing tool having a probe controller and a scheduler, scheduling delays in the sending of the video data from the data buffers during a probing window; and using the achievable bandwidth to direct the video data packets at the data buffers in order to optimize usage of bandwidth on paths in the application layer.

11. The method of claim 10 including delaying forwarding of streaming video packets during a probing window so that outgoing data rate of the streaming video packets is raised above a pre-established video bit rate;
using the outgoing data rate during the probing window to determine actual packet arrival time; and
comparing actual packet arrival time with an estimated arrival time in order to obtain an estimate of the achievable bandwidth.

\* \* \* \* \*